April 23, 1963 S. B. SILVERSCHOTZ 3,086,393
ICE DETECTOR
Filed June 30, 1959
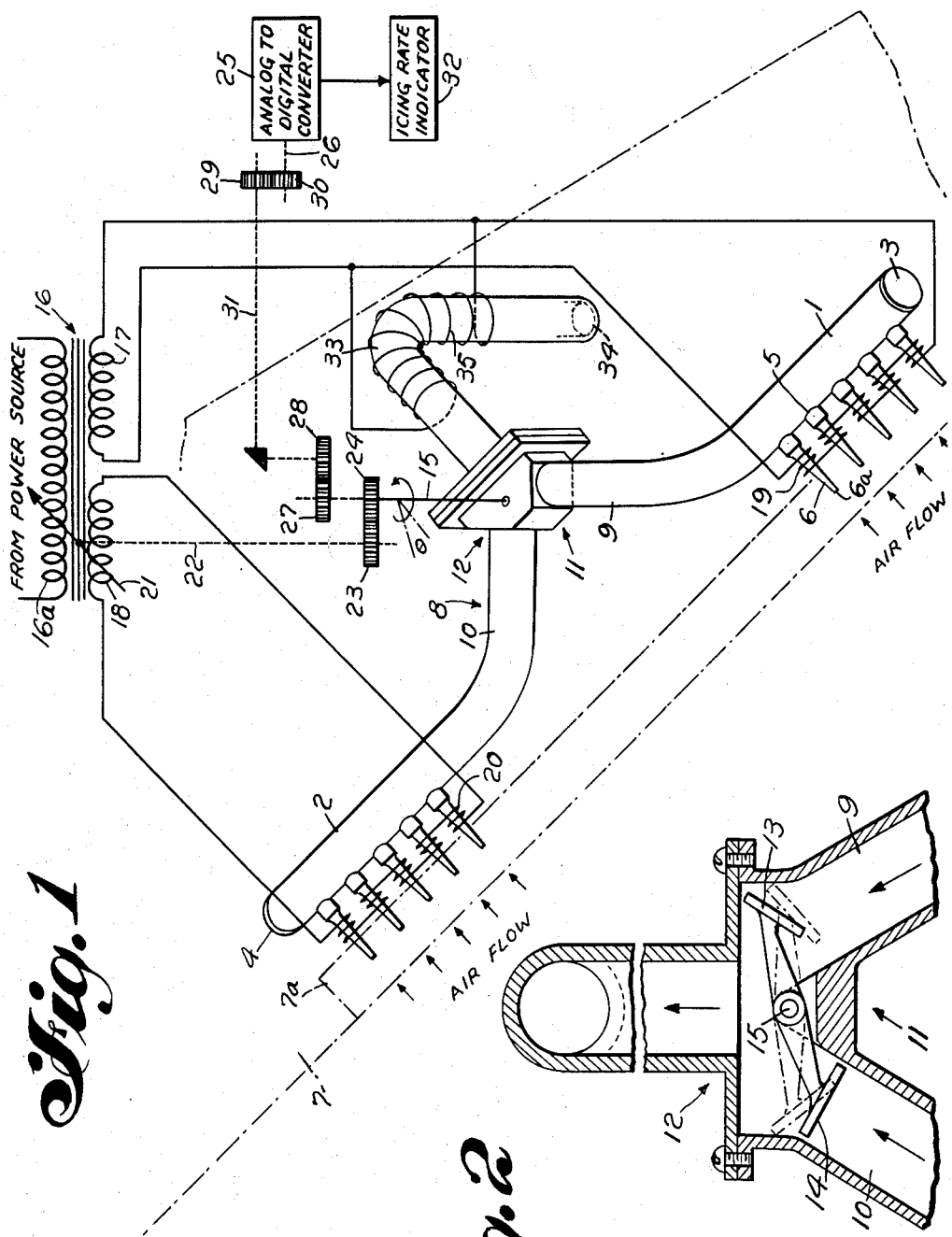
INVENTOR.
STANFORD B. SILVERSCHOTZ
BY
ATTORNEY United States Patent Office 3,086,393
Patented Apr. 23, 1963

3,086,393
ICE DETECTOR
Stanford B. Silverschotz, New York, N.Y., assignor to International Telephone and Telegraph Corporation, Nutley, N.J., a corporation of Maryland
Filed June 30, 1959, Ser. No. 824,122
8 Claims. (Cl. 73—170)

This invention relates to an ice detector and more particularly to apparatus for detecting and correcting for icing conditions in an atmosphere whenever there is relative motion between the atmosphere and the ice detector, for example, as might be found in the airstream around an aircraft.

This invention is further related to a means for detecting the absolute formation of ice on the detector and to provide for the indication of the rate of icing.

When air is only a few degrees below freezing, supercooled droplets of water exist in the atmosphere. When these supercooled droplets impinge on a cold object, surface tension tends to hold them together and these droplets freeze to form a layer of glazed ice. If the water vapor in the air is much below the freezing point, i.e., below 15 degrees Fahrenheit, and strikes a surface, it very slowly sublimes to form the porous ice known as rime ice or hoarfrost. In the past, measurement of icing rate was a method used for obtaining the liquid water content of air besides its use as an important air flight datum.

One prior art device for measuring icing rate, consisted of apparatus for measuring the duty cycle of a heating unit required to open a series of small apertures on the sensing units of a V-shaped tube adapted to become plugged by ice accretion in the windstream. The closing of the apertures by ice and concomitant reduction of total pressure was then detected by a differentially activated bellows linked to the armature of a switch. A continuously deiced Pitot tube provided comparative total pressure and a leak to static pressure for activation of the bellows.

However, in the prior art device described, it was found that where icing is caused by the freezing of supercooled droplets of water and the adherence of ice particles thus formed, that the large streamlined appearance of the sensor units would cause the airstream to deflect gradually and carry the water droplets away from the apertures, the droplets freezing upon contact with some other obstruction. This objection, seriously reduced the sensitivity of the prior art device.

Furthermore, this device of the prior art was found to suffer from a rather long response time in going from the "heat-off" period of the duty cycle to the "heat-on" period and therefore limited the usefulness of the instrument even at low speeds.

Icing clouds may range in length from about a few hundred feet to lengths of several hundred miles. Thus, an aircraft, for example, flying at Mach 0.97 may experience icing encounters for periods shorter than one half a second, or possibly longer than one hour. Because of the thermal lag in deicing and the delay required for bleeding to static pressure of the prior art device described above, such instruments are useless in today's transonic and supersonic aircraft.

Therefore, it is an object of this invention to provide an ice detector having an improved sensitive icing sensor.

It is a further object of this invention to provide an ice detector having a fast response.

Another object is to provide an improved ice detector for indicating the rate of ice accumulation.

Another object is to provide an improved ice detector for use in aircraft, especially those traveling at transonic or supersonic speeds.

Accordingly, one of the features of this invention is to provide a more sensitive ice detector by the use of hypodermic needle-like projections on the icing sensor units. This configuration of the projections presents a small sharp obstruction to the airstream causing it to deflect abruptly whereupon the momentum of the heavier or denser water droplet will prevent its being carried around the projection. As a result, the droplet will strike the obstruction and freeze causing a more rapid build-up of ice than that of large, well rounded or streamlined objects.

Another feature is the use of a balanced tuning vane operated by ram pressure existing in the sensor units of the present invention.

Another feature of this invention is the use of an analog-to-digital converter which is responsive to the said tuning vane and employed in the indication of the rate of icing.

The above-mentioned and other features and objects of this invention will become more apparent by reference to the following detailed description taken in conjunction with the accompanying drawings, wherein:

FIG. 1 illustrates a combination perspective, block and schematic diagram of the improved ice detector of the present invention; and FIG. 2 is a view partly in cross-section of the details of the tuning vane.

Referring to FIG. 1, there is provided a pair of hollow geometrically similar shaped sensor elements 1 and 2, the ends 3, 4 of which are sealed. The sensor elements have a plurality of openings, as for example, indicated by the reference numeral 5, to which are connected hollow open-ended extensions, such as the reference 6, which are of minute cross-sectional area. For the purpose of illustration, the cross-sectional area of the hollow extension has been greatly exaggerated.

In FIG. 1, the embodiment is illustrated as being mounted in the wing 7 of an aircraft with the hollow extensions 6 being located in an orifice 7a provided on the wings leading edge. The hollow extensions 6 are positioned so that their cross-sectional area is normal to the direction of the airflow.

Connected to, or as illustrated in FIG. 1 as forming an integral part thereof, the sensor elements 1, 2 is a hollow V-shaped tube, generally indicated by the reference numeral 8, having each of its legs 9, 10 connected to the open ends of the sensor elements 1, 2 respectively.

At the junction 11 of the V-shaped tube 8, as illustrated in FIGS. 1 and 2, there is disposed a balanced tuning vane, generally indicated by the reference numeral 12, having a pair of symmetrical butterfly deflection plates 13, 14 located at the end of legs 9, 10 respectively. Connected to the deflection plates 13, 14 is a shaft 15 which extends past the exterior of the wall of the V-shaped tube 8.

A transformer 16, whose primary winding 16a is connected to a suitable source of power supply, not shown, has two secondary windings, 17, 18 which are fixed and adjustable respectively. The fixed secondary winding 17 is connected to the heating coils 19 which are located at the hollow extensions of sensor element 1. The adjustable secondary winding 18 is connected similarly to the heating coils 20 located at the hollow extensions of sensor element 2. The armature 21 of the adjustable winding 18 is connected by a shaft 22, illustrated as a broken line, to the shaft 15 by means of gears 23, 24.

If it is desired to utilize the device as an icing rate indicator, an analog-to-digital converter 25, similar to the one described in a pending United States patent application, Serial No. 657,686 of J. Luongo et al., filed May 7, 1957, entitled "Mechanical-Electrical Transducer," now abandoned, and assigned to the same assignee of the present application is provided. The input shaft 26 of the converter is driven by shaft 15 by means of gears 27, 28, 29 and 30 and connecting shaft 31, the latter being illustrated as a broken line. As disclosed in the above referenced application, the analog-to-digital converter has a rotatable coded wheel, not shown, connected by suitable gears, not shown, to the input shaft 26 and thereby its position indicates the position of the input shaft 26 as well as shaft 15. The device of the pending application provides a readout means, not shown, that includes readout wires connected to stationary brushes that are in commutation with the coded wheel and thereby indicate electrically the position of shaft 26. As applied to the present invention, the output of the readout means, would thus indicate the rate of icing, and would be displayed on a suitable indicator 32, as for example, a C.R.T. display, or the information may be coded, as for example, on tapes or cards in a well-known manner.

A hollow protraction 33, which is illustrated as an integral part thereof, is provided on the V-shaped tube which is open-ended at the base of its junction. The hollow extension 33 is likewise open-ended, as illustrated by the reference numeral 34, to provide a means for disposing the water that condenses from the deicing and collects within the apparatus, said water being flushed by the motion of the airflow through the apparatus. A heating coil 35 is provided at this position as a precaution against icing and mechanical binding of the vane 12 and is connected to the secondary winding 17. In a similar manner, if desired, heating coils could be provided at other positions of the apparatus where undesirous icing conditions may occur.

The operation of the apparatus as described above, may be explained as follows:

Referring to FIG. 1, the hollow extensions 6 of the sensor element 1 are maintained in a constantly deiced condition by means of the heating coils 19 and their connection to the secondary winding 17 which is maintained constantly energized. The hollow extensions of the sensor element 2, however, are not maintained in a deiced condition. The adjustable secondary winding 18 is positioned so that none or a negligible amount of energy from the primary winding 16a is induced therein, thereby causing the heating coils 20 to be inoperative.

The positioning of the adjustable secondary winding 18 is accomplished by the tuning vane 12 whose shaft 15 is connected to the armature 21 of the adjustable secondary winding.

When there is relative motion between the apparatus of the present invention and the atmosphere, air will enter the hollow extensions 6 at the opening 6a. If no icing occurs, or is present, as for example, where the aircraft may not be encountering an icing cloud or condition, the ram pressure in each of the sensor elements 1, 2 and legs 9, 10 will be equal, thereby causing no deflection of the butterfly plates 13 and 14 and shaft 15 will not rotate. The tuning vane 12 is designed to be in balance about a fulcrum independent of the air speed when the detecting needles, i.e., the hollow extensions 6 are not plugged by ice, and under these circumstances the heating coils 20 will be so positioned as to be inoperative.

If an icing condition is present, ice will form and accumulate in the detection needle-like hollow extensions of the sensor element 2, for the reasons stated above, causing a reduction in the ram pressure existing in sensor element 2 and leg 10. Since the ram pressure in sensor element 1 and leg 9 is not reduced because of the impossibility of ice forming in the constantly deiced hollow extensions of sensor element 1, an unbalance results at the deflection plates 13, 14 which produces a proportional rotation of shaft 15 through some angle θ from the balanced position. The shaft 15, by virtue of its connection to the armature 21 of the secondary winding 18, correspondingly tunes the secondary winding 18 to the corresponding proportional degree of inductive coupling required to furnish the minimum current necessary to melt the ice accumulated in the hollow extensions of sensor element 2 by means of the heating coils 20. The air flow flushes the melted ice at the open-end 34. The ram pressure in sensor element 2 builds up at the rate at which the ice melts. Upon completion of the ice meltage the ram pressure in sensor element 2 is equal to that of sensor element 1 and the system is once more in balance and at which time heating coil 20 will be inoperative. Thereupon the cycle is ready to repeat itself if required.

For increased sensitivity a large number of needle extensions 6 should be used. Also the larger the number used, the less chance there is of an error being introduced by impingement of foreign matter. The needle-like hollow extensions 6 are fabricated of rigid material having a low mass and a low specific heat, whereby they are deiced very rapidly by the inductive heating. Although not shown, it is obvious to one skilled in the art that the deicing equipment of the aircraft is connected under the direct control of the invention.

For an indication of the rate of icing, the analog-to-digital converter 25 translates the displacement of the shaft 15 by means 26—31 to an electrical signal, as described above, the shaft displacement being proportional to the rate of ice accumulation. The electrical signal is then fed to an icing rate indicator 32 in a manner well known to those skilled in the art.

While this invention is described and/or illustrated as being geometrically similar shaped and/or symmetrically shaped, as for example, hollow extensions 6, sensor elements 1, 2 the V-shaped tube 8, and balanced tuning vane 12, it is clearly obvious that other geometrical shapes and non-symmetrical configurations can be utilized without departing from the spirit of this invention.

While I have described above the principles of my invention in connection with specific apparatus, it is clearly understood that this description is made by way of example and not as a limitation to the scope of my invention as set forth in the objects thereof and in the accompanying claims.

I claim:

1. In a system for detecting the presence therein of ice formed during relative motion between the system and the atmosphere, a first sensor element, a second sensor element, said first and second sensor elements each having at least one hollow extension projecting into said atmosphere, each said hollow extension converges to a particularly minute opening which presents a minimum frontal area into the direction of said relatively moving atmosphere, means to maintain said first sensor element at a temperature sufficient to prevent ice from forming therein, means sensitive to the pressure differences between said first and said second sensor elements due to the formation and accumulation of ice in said second sensor element, and means responsive to said sensitive means to melt said accumulated ice.

2. In a system according to claim 1, further including means responsive to said sensitive means to determine the rate of ice accumulation in said second sensor.

3. In a system for detecting the presence therein of ice formed during relative motion between the system and the atmosphere, a first sensor element, a second sensor element, said first and second sensor elements each comprising a hollow tube having a plurality of hollow extensions, each said hollow extensions converging to a particularly minute opening which presents a minimum of cross-sectional area normal to the direction of said motion, means to maintain said first sensor element at a temperature sufficient to prevent ice from forming therein, means sensitive to the difference in ram pressure between said first and said second sensor elements due to the formation and accumulation of ice in said second sensor element, said sensitive means comprising a tuning vane having a pair of deflection plates, means to direct the ram pressure of each of said sensor elements to a corresponding one of said pair of deflection plates, and means responsive to said sensitive means to melt said ice accumulation.

4. In a system for the detection of the presence therein of ice formed during relative motion between the system and the atmosphere, a first and second sensor element each comprising a hollow tube having a plurality of symmetrical hollow extensions each of which converges to a particularly minute opening which presents a minimum of cross-sectional area normal to the direction of said motion, means to maintain said first sensor element at a temperature sufficient to prevent ice from forming therein, means sensitive to the difference in ram pressure between said first and said second sensor elements whenever ice forms or accumulates in said second sensor, said sensitive means comprising a balanced tuning vane having a pair of deflection plates, a V-shaped tubular member to direct respectively the ram pressure from each of said first and second sensor elements to a corresponding one of said pair of deflection plates, said tubular member having the ends of its legs connected respectively to said first and second sensor elements and having said pair of deflection plates disposed in the junction thereof, and means responsive to said sensitive means to melt said ice accumulation whenever the equilibrium of said balance tuning vane is disturbed.

5. In a system for the detection of the presence therein of ice formed during relative motion between the system and the atmosphere, a first and second sensor element each comprising a hollow tube having a plurality of symmetrical hollow extensions, each of said symmetrical hollow extensions converges to a particularly minute opening which presents a minimum of cross-sectional area normal to the direction of said motion, means to maintain said first sensor element at a temperature sufficient to prevent ice from forming therein, said latter means comprising an inductively heated element in close proximity to said first sensor element, means sensitive to the difference in ram pressure between said first and said second sensor elements whenever ice forms or accumulates in said second sensor, said sensitive means comprising a balanced tuning vane having a shaft and a pair of deflection plates connected to said shaft, means to direct respectively the ram pressure from each of said first and second sensor elements to corresponding ones of said pair of deflection plates, said means to direct comprising a hollow V-shaped tubular member having the ends of its legs connected respectively to said first and second sensor elements and having said pair of deflection plates disposed in the junction thereof, and means responsive to said sensitive means to melt said ice accumulation, said responsive means comprising an adjustable inductively heated element in close proximity to said second sensor element.

6. In a system according to claim 5, further including an analog-to-digital converter connected to said vane shaft to determine the rate of ice accumulation in said second sensor.

7. In a system for detecting the presence therein of ice accumulation formed during relative motion between the system and the atmosphere comprising a hollow sensor element having a plurality of hypodermic needle-like hollow extensions communicating with the interior of said sensor element, said hollow extensions having a minimum cross-sectional area normal to the direction of said relative motion.

8. In a system for detecting the presence therein of ice accumulation formed during relative motion between the system and the atmosphere comprising a hollow sensor element having a plurality of hypodermic needle-like hollow extensions communicating with the interior of said sensor element, said hollow extensions having a minimum cross-sectional area normal to the direction of said relative motion and being constructed of a rigid low mass material having a low specific heat.

References Cited in the file of this patent

UNITED STATES PATENTS

| | | |
|---|---|---|
| 2,541,512 | Hahn | Feb. 13, 1951 |
| 2,557,311 | Pond | June 19, 1951 |
| 2,739,302 | Timbie | Mar. 20, 1956 |
| 2,750,737 | Leigh | June 19, 1956 |
| 2,755,456 | Bursack | July 17, 1956 |

FOREIGN PATENTS

| | | |
|---|---|---|
| 115,363 | Sweden | Nov. 13, 1945 |